(12) United States Patent
Yamada et al.

(10) Patent No.: US 12,392,170 B2
(45) Date of Patent: Aug. 19, 2025

(54) LOCK MECHANISM OF A STORAGE BOX

(71) Applicant: HONDA MOTOR CO., LTD., Tokyo (JP)

(72) Inventors: Tsuyoshi Yamada, Tokyo (JP); Takehiko Kikuchi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/951,452

(22) Filed: Sep. 23, 2022

(65) Prior Publication Data

US 2023/0100618 A1 Mar. 30, 2023

(30) Foreign Application Priority Data

Sep. 30, 2021 (JP) .................................. 2021-162264

(51) Int. Cl.
  *E05B 65/52* (2006.01)
  *E05B 83/16* (2014.01)

(52) U.S. Cl.
  CPC .............. *E05B 65/52* (2013.01); *E05B 83/16* (2013.01)

(58) Field of Classification Search
  CPC .......... E05B 65/52; E05B 77/08; E05B 83/24; E05B 83/243; E05B 83/28; E05B 83/16; E05B 83/18; E05B 83/22; E05B 83/30; E05B 83/32
  See application file for complete search history.

(56) References Cited

U.S. PATENT DOCUMENTS

| | | | | |
|---|---|---|---|---|
| 107,422 A | * | 9/1870 | Steinmetz | E05B 65/52 70/66 |
| 325,017 A | * | 8/1885 | Schmidt | E05B 65/52 70/66 |
| 1,623,318 A | * | 4/1927 | Rasmussen | E05B 65/467 292/259 R |
| 2,399,812 A | * | 5/1946 | Ledin | E05B 65/52 70/84 |
| 3,016,968 A | * | 1/1962 | Roberts, Jr. | E05B 81/10 292/201 |

(Continued)

FOREIGN PATENT DOCUMENTS

| CN | 1990331 A | 7/2007 |
|---|---|---|
| CN | 104937199 A | 9/2015 |

(Continued)

OTHER PUBLICATIONS

Japanese Office Action dated Jul. 11, 2023, Application No. JP 2021-162264, English translation included, 7 pages.

(Continued)

*Primary Examiner* — Christine M Mills
*Assistant Examiner* — Faria F Ahmad
(74) *Attorney, Agent, or Firm* — Rankin, Hill & Clark LLP

(57) ABSTRACT

A lock mechanism of a storage box can secure and release a lock pin of a lid member with a rotational operation of a cam member, and includes a cam support member for supporting the cam member, and a rotation lock plate for restricting the rotational movement of the cam member, in which the rotation lock plate is configured to restrict the rotational movement of the cam member in a case that the rotation lock plate is at a position along a contact part provided on the cam support member.

6 Claims, 8 Drawing Sheets

(56) References Cited

U.S. PATENT DOCUMENTS

| | | | | |
|---|---|---|---|---|
| 3,062,033 | A * | 11/1962 | Schmalfeldt | E05B 83/16 292/DIG. 43 |
| 3,113,447 | A * | 12/1963 | Oishei | E05B 81/52 292/201 |
| 3,401,968 | A * | 9/1968 | Testa | E05B 63/248 70/70 |
| RE27,390 | E * | 6/1972 | Allen | E05B 83/16 292/216 |
| 3,868,836 | A * | 3/1975 | La Roche | E05B 83/16 70/370 |
| 3,985,381 | A * | 10/1976 | Kobayashi | E05B 83/16 292/216 |
| 4,073,170 | A * | 2/1978 | Miyabayashi | E05B 83/16 292/216 |
| 4,194,377 | A * | 3/1980 | Maeda | E05B 85/243 292/216 |
| 4,492,101 | A * | 1/1985 | Tanaka | E05B 77/44 70/451 |
| 4,907,428 | A * | 3/1990 | Nakashima | B62J 9/40 70/279.1 |
| 5,071,179 | A * | 12/1991 | Brackmann | E05B 79/06 292/DIG. 60 |
| 5,445,326 | A * | 8/1995 | Ferro | E05B 83/26 292/DIG. 43 |
| 5,894,749 | A * | 4/1999 | Tomaszewski | E05B 83/16 292/DIG. 43 |
| 6,014,876 | A * | 1/2000 | Taylor | B60R 25/04 70/451 |
| 6,135,514 | A * | 10/2000 | Kowalewski | E05B 79/20 292/216 |
| 6,192,725 | B1 * | 2/2001 | Watson | E05B 85/18 292/DIG. 43 |
| 6,223,468 | B1 * | 5/2001 | Kobayashi | E05B 81/20 292/201 |
| 6,247,732 | B1 * | 6/2001 | Alton | E05B 79/20 292/216 |
| 6,369,395 | B1 * | 4/2002 | Roessler | B60Q 3/30 250/462.1 |
| 6,378,920 | B1 * | 4/2002 | Ostrowski | E05B 83/16 292/216 |
| 6,581,987 | B1 * | 6/2003 | Gentile | E05B 83/24 292/216 |
| 6,973,810 | B2 * | 12/2005 | Chen | E05C 3/24 292/216 |
| 7,195,090 | B2 * | 3/2007 | Parks | E05B 77/08 180/271 |
| 7,455,333 | B2 * | 11/2008 | Ookawara | E05B 83/30 292/34 |
| 9,074,389 | B2 * | 7/2015 | Shimizu | E05D 1/04 |
| 10,287,806 | B2 * | 5/2019 | Mizuno | E05B 79/10 |
| 11,555,339 | B2 * | 1/2023 | Tamura | E05B 83/26 |
| 11,746,573 | B2 * | 9/2023 | Lim | E05B 79/20 292/92 |
| 2002/0027497 | A1 * | 3/2002 | Sumada | B62J 9/23 340/425.5 |
| 2003/0081995 | A1 * | 5/2003 | Acciacca | E05B 83/16 403/353 |
| 2003/0173796 | A1 * | 9/2003 | Harima | B60J 5/101 296/146.7 |
| 2003/0227177 | A1 * | 12/2003 | Matsuda | E05B 81/16 292/216 |
| 2006/0027003 | A1 * | 2/2006 | Mizukura | E05B 17/16 70/252 |
| 2006/0202485 | A1 * | 9/2006 | Yamamoto | E05B 81/20 292/201 |
| 2007/0163310 | A1 * | 7/2007 | Ookawara | E05C 1/145 70/208 |
| 2011/0140461 | A1 * | 6/2011 | Murray | E05B 79/20 292/216 |
| 2012/0274457 | A1 * | 11/2012 | Burns | E05B 85/18 70/91 |
| 2013/0219974 | A1 * | 8/2013 | Lange | E05B 81/14 70/91 |
| 2016/0194907 | A1 | 7/2016 | Kikuchi et al. | |
| 2016/0201362 | A1 | 7/2016 | Mizuno et al. | |
| 2017/0036642 | A1 | 2/2017 | Nomura | |
| 2018/0276921 | A1 * | 9/2018 | Haber | G07C 5/0858 |
| 2019/0218834 | A1 * | 7/2019 | Komatsu | E05B 77/44 |
| 2019/0351952 | A1 * | 11/2019 | Hunt | B62D 33/037 |
| 2021/0317690 | A1 * | 10/2021 | Nakasone | E05C 9/043 |

FOREIGN PATENT DOCUMENTS

| | | | | |
|---|---|---|---|---|
| CN | 105781279 A | 7/2016 | | |
| CN | 105829172 A | 8/2016 | | |
| DE | 10034523 A1 * | 1/2002 | | B60R 21/38 |
| EP | 1172507 A2 * | 1/2002 | | E05B 77/02 |
| EP | 1 808 366 A2 | 7/2007 | | |
| JP | S62-146379 | 6/1987 | | |
| JP | 2007-176239 A | 7/2007 | | |
| JP | 2012-201356 A | 10/2012 | | |
| JP | 2014-134093 A | 7/2014 | | |
| JP | 2015-123774 A | 7/2015 | | |

OTHER PUBLICATIONS

Chinese Office Action Corresponding to CN Application No. 20221117962.1A, dated May 22, 2025, 13 pages.

* cited by examiner

LOCK MECHANISM OF A STORAGE BOX

INCORPORATION BY REFERENCE

The present application claims priority under 35 U.S.C. § 119 to Japanese Patent Application No. 2021-162264 filed on Sep. 30, 2021. The content of the application is incorporated herein by reference in its entirety.

BACKGROUND OF THE INVENTION

Field of the Invention

The present invention relates to a lock mechanism of a storage box.

Description of the Related Art

Conventionally, a storage box apparatus is known that includes a lock mechanism capable of securing and releasing a lock pin of a lid member with a rotational operation of a cam member (see, e.g., Japanese Patent Laid-Open No. 62-146379). A storage box apparatus of this type includes a link mechanism that enables a rotational movement of a cam member and releasing the engagement of the link mechanism disables the rotational movement of the cam member and locks the storage box apparatus.

However, there is a problem in the related art in that the number of parts of the link mechanism is large, which leads to a complex movement of the link mechanism.

SUMMARY OF THE INVENTION

A lock mechanism of a storage box is capable of securing and releasing a lock pin of a lid member with a rotational operation of a cam member, and includes a cam support member for supporting the cam member, and a rotation lock plate for restricting a rotational movement of the cam member. In the lock mechanism, the rotation lock plate is configured to restrict the rotational movement of the cam member in a case that the rotation lock plate is at a position along a contact part provided on the cam support member.

To restrict the rotational movement of the cam member, it is just needed to move the rotation lock plate to a position where the rotation lock plate contacts the cam member. Therefore, the link mechanism is not needed, the number of parts is reduced, and the structure is simplified.

Also, even in a case that a large load is applied to the cam member, a rotational movement of the cam member is restricted by a cooperation between the rotation lock plate and the contact part of the cam support member, and thus strength of the rotation lock plate is reinforced.

DETAILED DESCRIPTION OF THE PREFERRED EMBODIMENT

Figure 1:
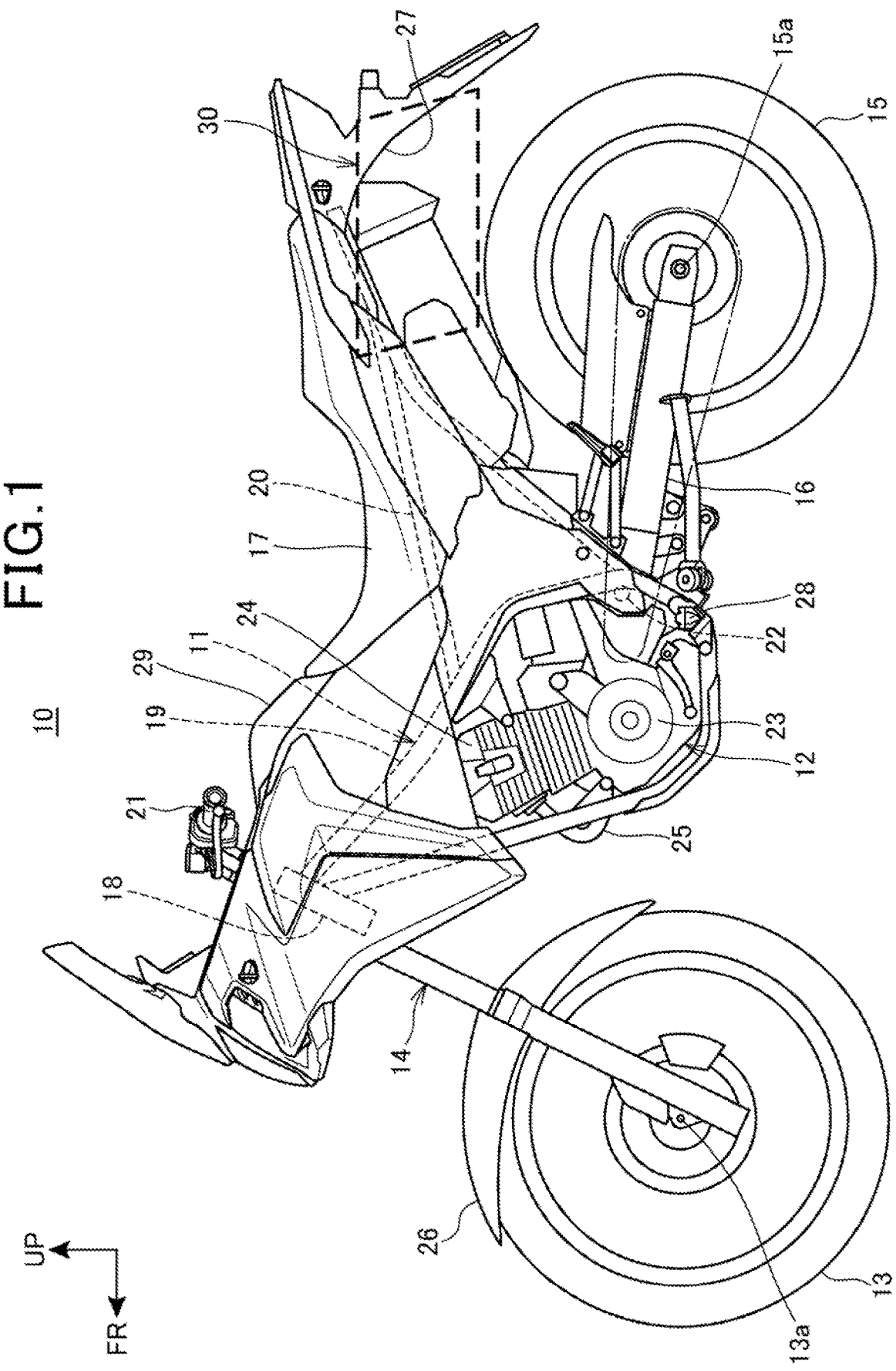
FIG. 1 is a side view of a saddle-ride vehicle according to an embodiment.

An embodiment of the present invention will be described below with reference to the drawings. Unless otherwise mentioned, directions including front-rear, left-right, and up-down mentioned in the description are the same as those directions relative to a vehicle body. Reference signs FR, UP, and LH shown in the drawings indicate a vehicle body front side, a vehicle body upper side, and a vehicle body left side, respectively.

Embodiment

FIG. 1 is a side view of a saddle-ride vehicle 10 according to an embodiment of the present invention.

The saddle-ride vehicle 10 is a vehicle including a vehicle body frame 11, a power unit 12 supported on the vehicle body frame 11, a front fork 14 that supports a front wheel 13 in a steerable manner, a swing arm 16 that supports a rear wheel 15, and a seat 17 for a rider.

The saddle-ride vehicle 10 is a vehicle on which the rider sits astride the seat 17. The seat 17 is provided above a rear part of the vehicle body frame 11.

The vehicle body frame 11 includes a head pipe 18 provided at a front end portion of the vehicle body frame 11, a front frame 19 located on a rear side of the head pipe 18, and a rear frame 20 located on a rear side of the front frame 19. A front end portion of the front frame 19 is connected to the head pipe 18.

The seat 17 is supported on the rear frame 20.

The front fork 14 is supported on the head pipe 18 in such a manner that it can be steered left and right. The front wheel 13 is supported on an axle 13a provided at a lower end portion of the front fork 14. A handle 21 for steering that the rider grasps is mounted at an upper end portion of the front fork 14.

The swing arm 16 is supported on a pivot shaft 22 that is supported on the vehicle body frame 11. The pivot shaft 22 is a shaft extending horizontally in a vehicle width direction. The pivot shaft 22 is passed through a front end portion of the swing arm 16. The swing arm 16 swings up and down around the pivot shaft 22.

The rear wheel 15 is supported on an axle 15a provided at a rear end portion of the swing arm 16.

The power unit 12 is disposed between the front wheel 13 and the rear wheel 15 and supported on the vehicle body frame 11.

The power unit 12 is an internal combustion engine. The power unit 12 includes a crankcase 23 and a cylinder 24 that houses a reciprocating piston. An exhaust device 25 is connected to an exhaust port of the cylinder 24.

An output of the power unit 12 is transmitted to the rear wheel 15 through a drive power transmission member that connects the power unit 12 and the rear wheel 15 to each other.

The saddle-ride vehicle 10 further includes a front fender 26 that covers the front wheel 13 from above, a rear fender 27 that covers the rear wheel 15 from above, footrests 28 on which the rider places his or her feet, and a fuel tank 29 that stores fuel to be used by the power unit 12.

The front fender 26 is mounted on the front fork 14. The rear fender 27 and the footrests 28 are provided on a lower side relative to the seat 17. The fuel tank 29 is supported on the vehicle body frame 11.

The saddle-ride vehicle 10 includes a storage box 30 on a rear side of the vehicle.

Figure 2:
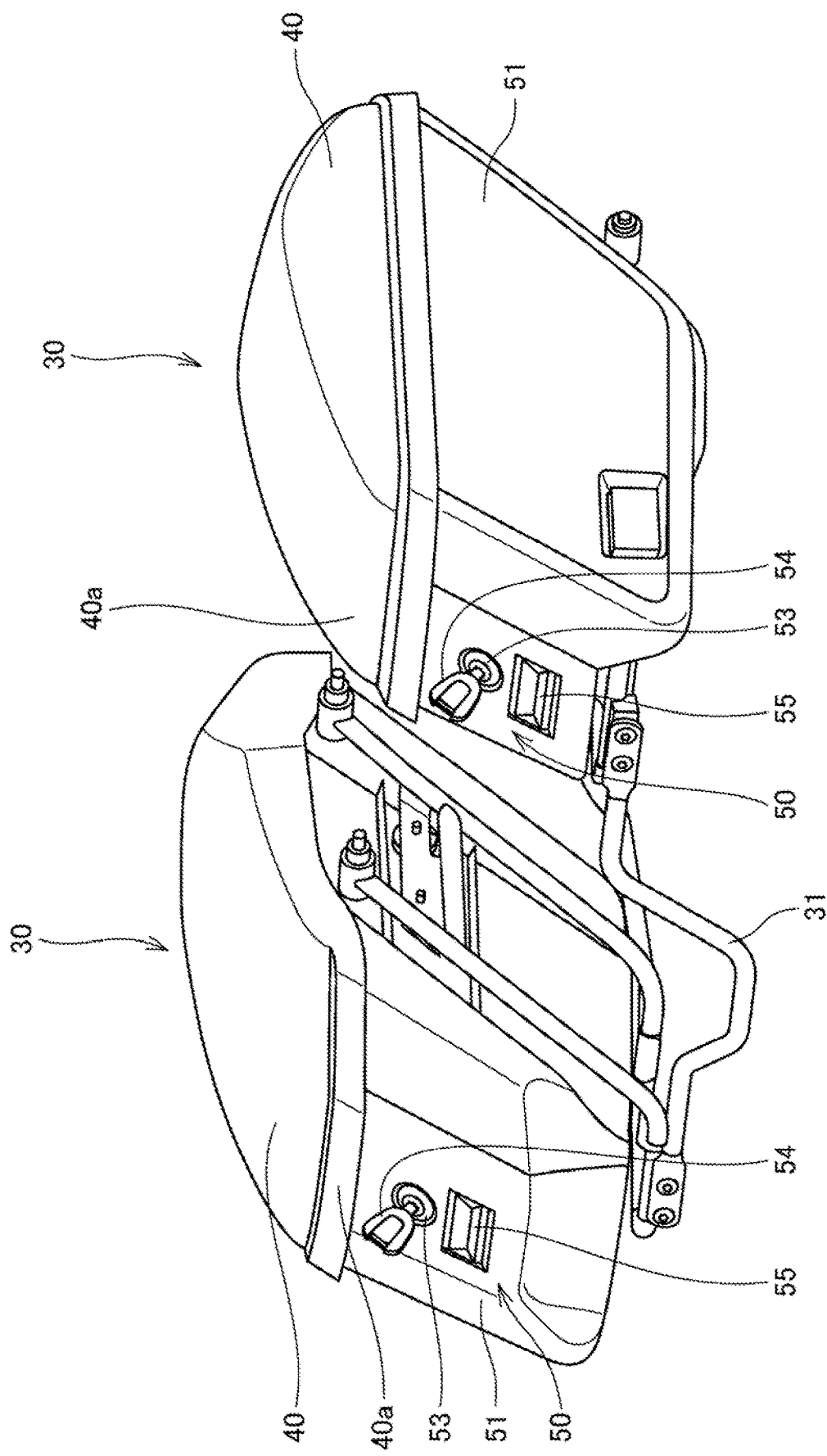
FIG. 2 is a perspective view of a storage box according to the embodiment.
Figure 3:
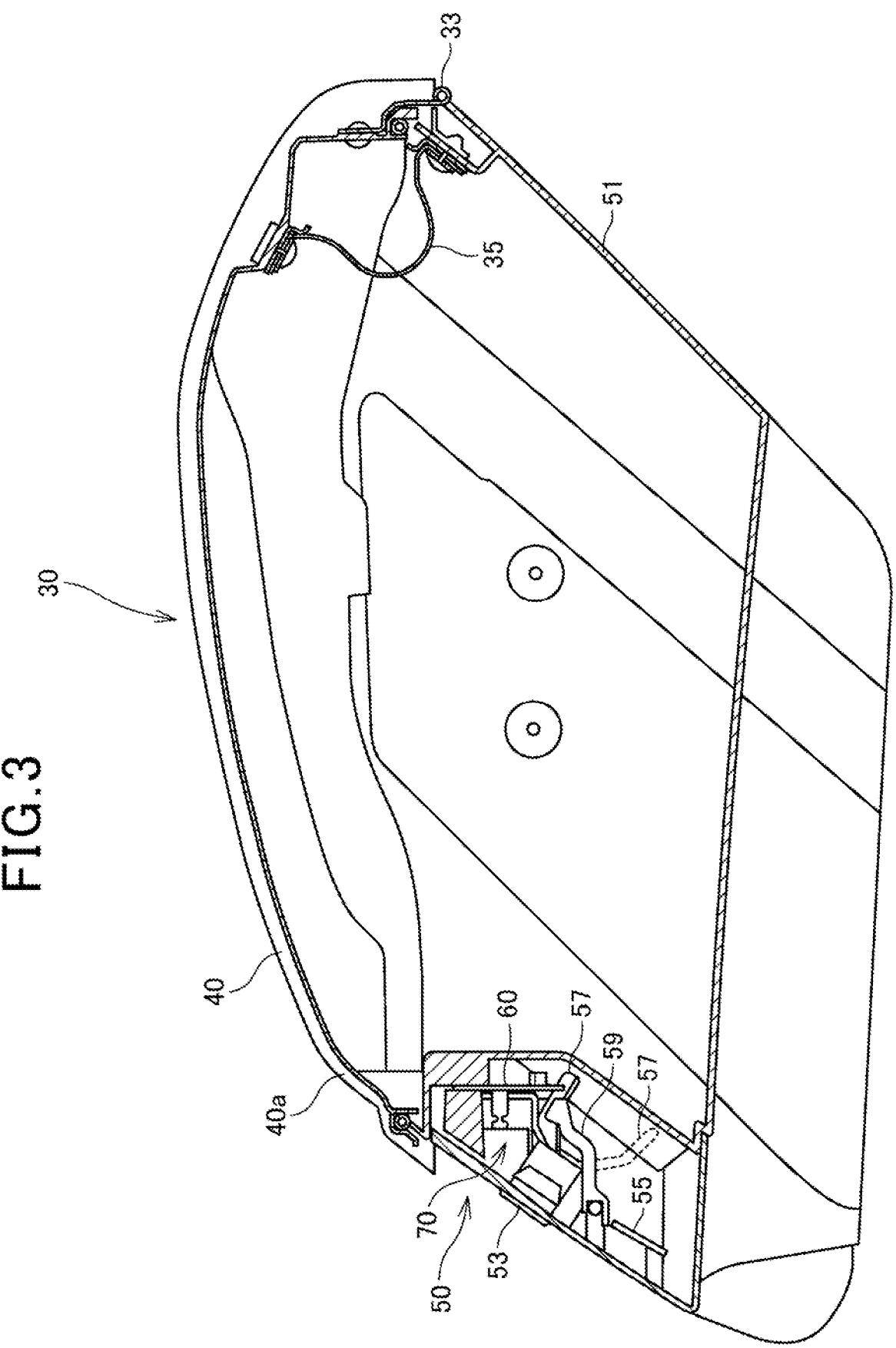
FIG. 3 is a vertical cross-sectional view in a front-rear direction of the storage box according to the embodiment.

FIG. 2 is a perspective view of the storage box 30, and FIG. 3 is a vertical cross-sectional view in a front-rear direction of the storage box 30.

A pair of storage boxes 30 are attached to left and right sides of the vehicle body frame 11 via a pipe-shaped attachment member 31.

Because the left and right storage boxes 30 have the same structures, the storage box 30 attached to the right side is described below, and regarding the storage box 30 attached to the left side, the same reference numbers are added to the same parts and the description is omitted.

The storage box 30 includes a lid member 40 and a box-shaped housing 51 having an opening at its top part. As illustrated in FIG. 3, the lid member 40 is connected to a front part of the housing 51 via a hinge 33, and the lid member 40 is opened by lifting up a rear part 40a of the lid member 40. The hinge 33 is covered by a cover 35 from a rear side. The movable range of the lid member 40 is limited by the cover 35 so that the lid member 40 does not open too much.

A lock mechanism 50 is provided at the rear side of the housing 51. As illustrated in FIG. 2, the lock mechanism 50 includes, outside the housing 51, a key cylinder 53 and an operation member 55. And as illustrated in FIG. 3, the lock mechanism 50 includes, inside the housing 51, a tabular, cam support member 60 and a cam mechanism 70 attached to the cam support member 60.

The operation member 55, in response to being pushed down, tilts a lever 59 to move the cam mechanism 70, which releases the lock between the rear part 40a of the lid member 40 and a rear part of the housing 51. Thus, opening and closing of the lid member 40 is enabled.

A key 54 can be inserted into the key cylinder 53 to rotate. In a case that the key 54 is rotated to a lock position, a rotation lock plate 57 attached to the key cylinder 53 is rotated to lock the lock mechanism 50 so that a lock between the lid member 40 and the housing 51 cannot be released even if the operation member 55 is pushed down. While the lock mechanism 50 is locked, the rotation lock plate 57 is at a position illustrated with solid lines in FIG. 3 and, while the lock mechanism 50 is not locked, the rotation lock plate 57 is at a position illustrated with dashed lines in FIG. 3.

In the present embodiment, the operation member 55 is a button that can be pushed down, an application of the present invention is not limited to the button-type operation member 55. For example, the operation may be carried out with a handle-type operation member or a cable which can be pulled to release a lock between the rear part 40a of the lid member 40 and the rear part of the housing 51.

Figure 4:
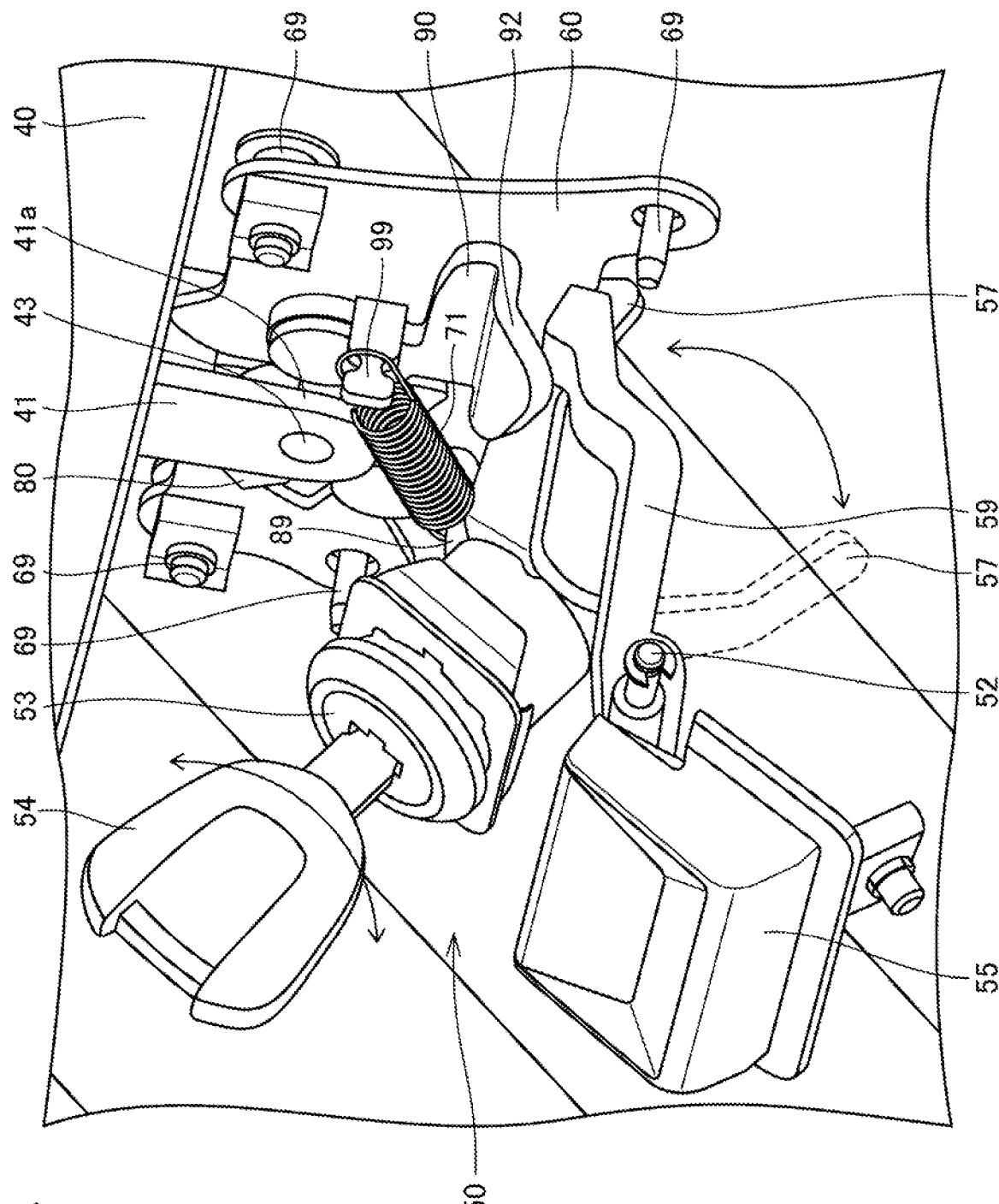
FIG. 4 is a perspective view of a lock mechanism according to the embodiment.
Figure 5:
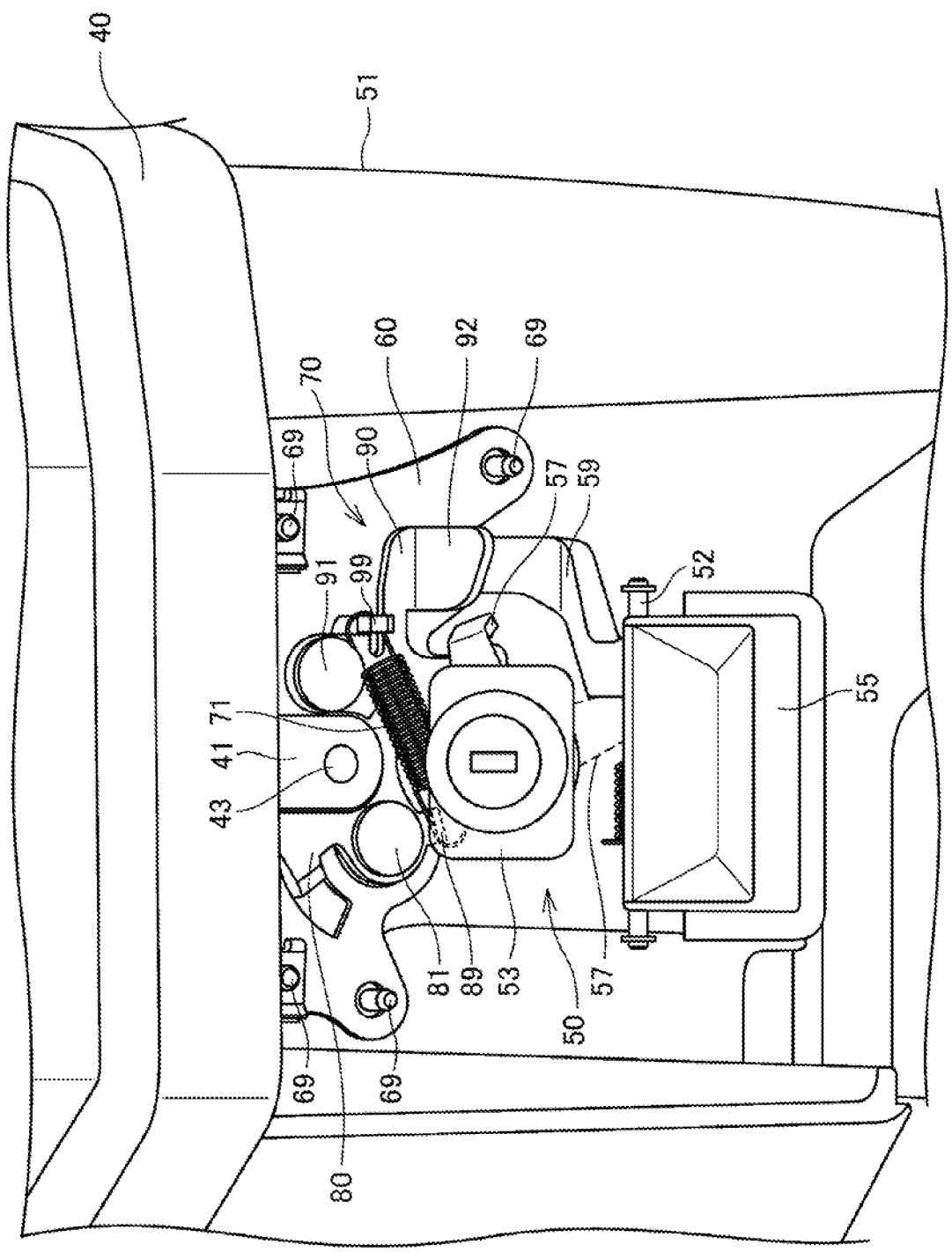
FIG. 5 is a perspective view seen from the rear of the lock mechanism according to the embodiment.

FIG. 4 is a perspective view of a lock mechanism 50, and FIG. 5 is a perspective view seen from the rear of the lock mechanism 50.

The lid member 40 includes, as illustrated in FIG. 4, a pin fixing member 41 and a lock pin 43.

The pin fixing member 41 is fixed to the lid member 40 at its top part. The pin fixing member 41 includes two protruding members 41a at its bottom part, which are formed to sandwich the cam support member 60 and a first cam 80 between the two protruding members 41a arranged in a front-rear direction. The lock pin 43 is fixed between the two protruding members 41a.

As illustrated in FIG. 5, according to the present embodiment, the key cylinder 53 is provided at a position between the operation member 55 and the cam mechanism 70, which allows for a compact arrangement of the lock mechanism.

The cam support member 60 is attached to the rear part of the housing 51 with a fixture 69. The cam mechanism 70 includes the first cam 80 and a second cam 90. The first cam 80 and the second cam 90 are rotatably attached to the cam support member 60 via a first cam support shaft 81 and a second cam support shaft 91, respectively.

The lever 59 connected to the operation member 55 is arranged at a position where the lever 59, in response to a tilt around a lever support shaft 52, pushes up a lever receiving part 92 provided on the second cam 90. The lever 59 is configured to be supported by an elastic member (not illustrated) such as a spring so that the lever 59 goes back to its home position.

As illustrated in FIGS. 4 and 5, a tension spring 71 is provided in a tensioned state between a first spring connection part 89 of the first cam 80 and a second spring connection part 99 of the second cam.

The first cam 80 is, with tension of the tension spring 71, constantly urged in a counterclockwise direction in FIG. 5 around the first cam support shaft 81, and the second cam 90 is constantly urged in a clockwise direction in FIG. 5 around the second cam support shaft 91.

Figure 6:
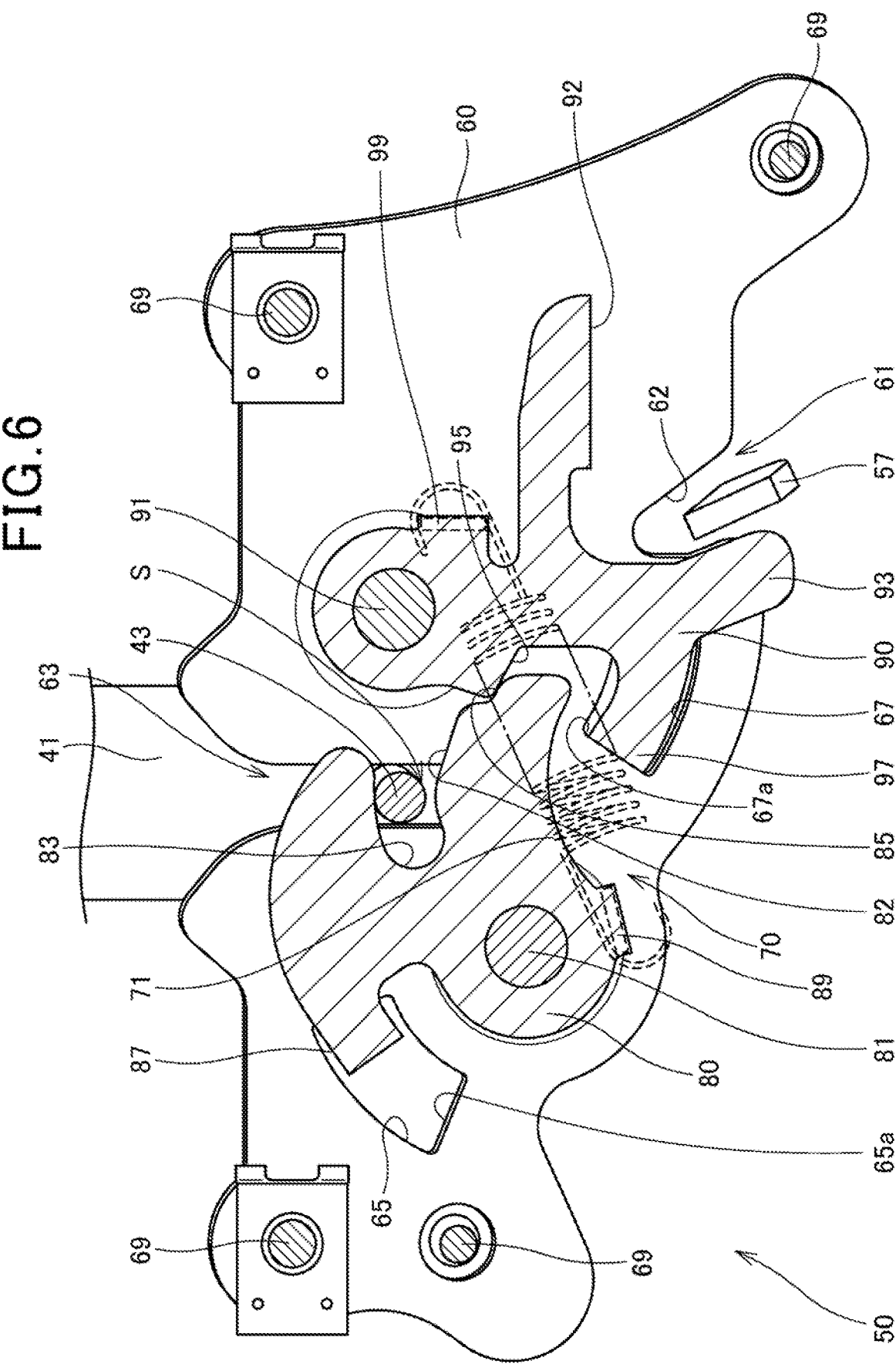
FIG. 6 is a cross-sectional view illustrating a cam member in a state where the lock mechanism is locked according to the embodiment.

FIG. 6 is a cross-sectional view in a cross-section including the first cam 80 and the second cam 90. In FIG. 6, the lock mechanism 50 is in a locked state, and the tension spring 71 is illustrated with dashed lines for convenience of explanation.

The first cam 80 includes a first concave part 83 into which the lock pin 43 is inserted, and a first engaging part 85 that contacts the second cam 90. The first cam 80 also includes a first engaging protrusion (a part of the cam member) 87 that is inserted into a first guide part (a guide part) 65 of the cam support member 60, and a first curved part 82 that contacts the lock pin 43 when the lid member 40 is being closed.

The first guide part 65 is a hole that is formed in a shape of a circular arc centered around the first cam support shaft 81, suppresses rattling of the first cam 80, by sliding the first engaging protrusion 87 therein, and also limits a rotation angle of the first cam 80.

The second cam 90 includes a second protruding part 93 that contacts the rotation lock plate 57, and a second engaging part 95 that contacts the first engaging part 85 of the first cam 80.

The second cam 90 also includes a second engaging protrusion (a part of the cam member) 97 that is inserted into the second guide part (a guide part) 67 of the cam support member 60.

The second guide part 67 is a hole that is formed in a shape of a circular arc centered around the second cam support shaft 91, suppresses rattling of the second cam 90, by sliding the second engaging protrusion 97 therein, and also limits a rotation angle of the second cam 90.

The cam support member 60 includes a plate-receiving concave part 61 into which the rotation lock plate 57 is inserted, a contact part 62 provided on the plate-receiving concave part 61, and a pin-receiving concave part 63 into which the lock pin 43 is inserted when the lid member 40 is closed.

In the present embodiment, the rotation lock plate 57 is inserted into the plate-receiving concave part 61, and, while the rotation lock plate 57 is at a position along the contact part 62, interferes with the second protruding part 93 to restrict the rotational (or pivotal) movement of the second cam 90.

In a case that the second cam 90 is rotated counterclockwise by an action of an excessive force, in a state where the rotation of the second cam 90 is restricted, the rotation lock plate 57 contacts the contact part 62 of the plate-receiving concave part 61, and the rotation of the second cam 90 in a counterclockwise direction is restricted by the contact part 62.

The contact part 62, instead of being provided on the plate-receiving concave part 61, may be provided on the cam support member 60, as long as it is in a rotation range of the second cam 90, and at a plane or a side of the cam support member 60 facing against a rotational direction of the second cam 90 moved by the lever 59. For example, even though the contact part 62 is provided on a protrusion formed on the cam support member 60, the rotation of the second cam 90 due to the action of the excessive force can be restricted by the contact part 62.

Regarding the lock mechanism of the storage box 30 of the above-described configuration, its operation is described below with reference to FIGS. 6 through 8.

(In a State where the Lid Member 40 is Opened)

Figure 7:
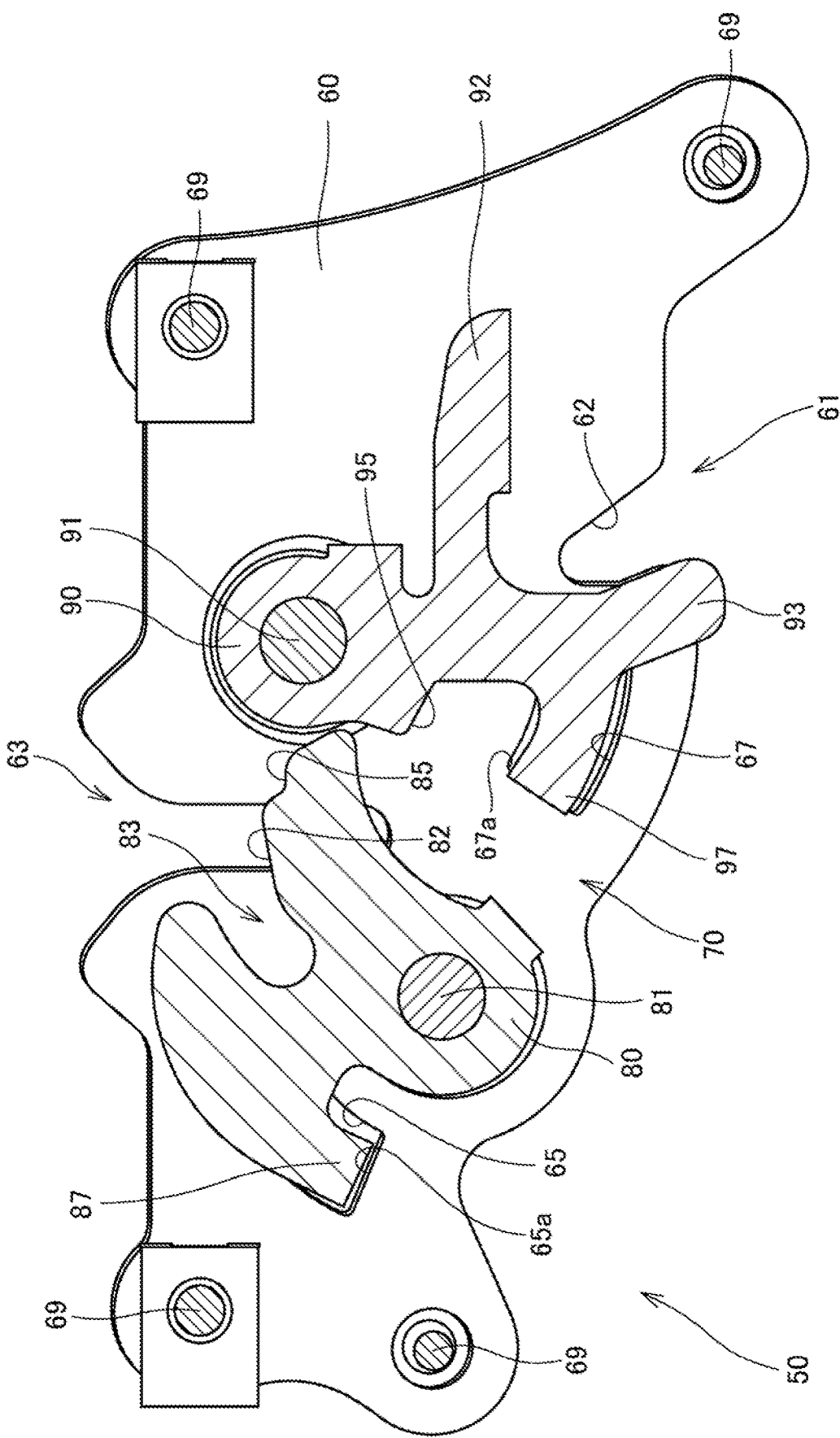
FIG. 7 is a cross-sectional view illustrating the cam member in a state where the lock mechanism is unlocked according to the embodiment.
Figure 8:
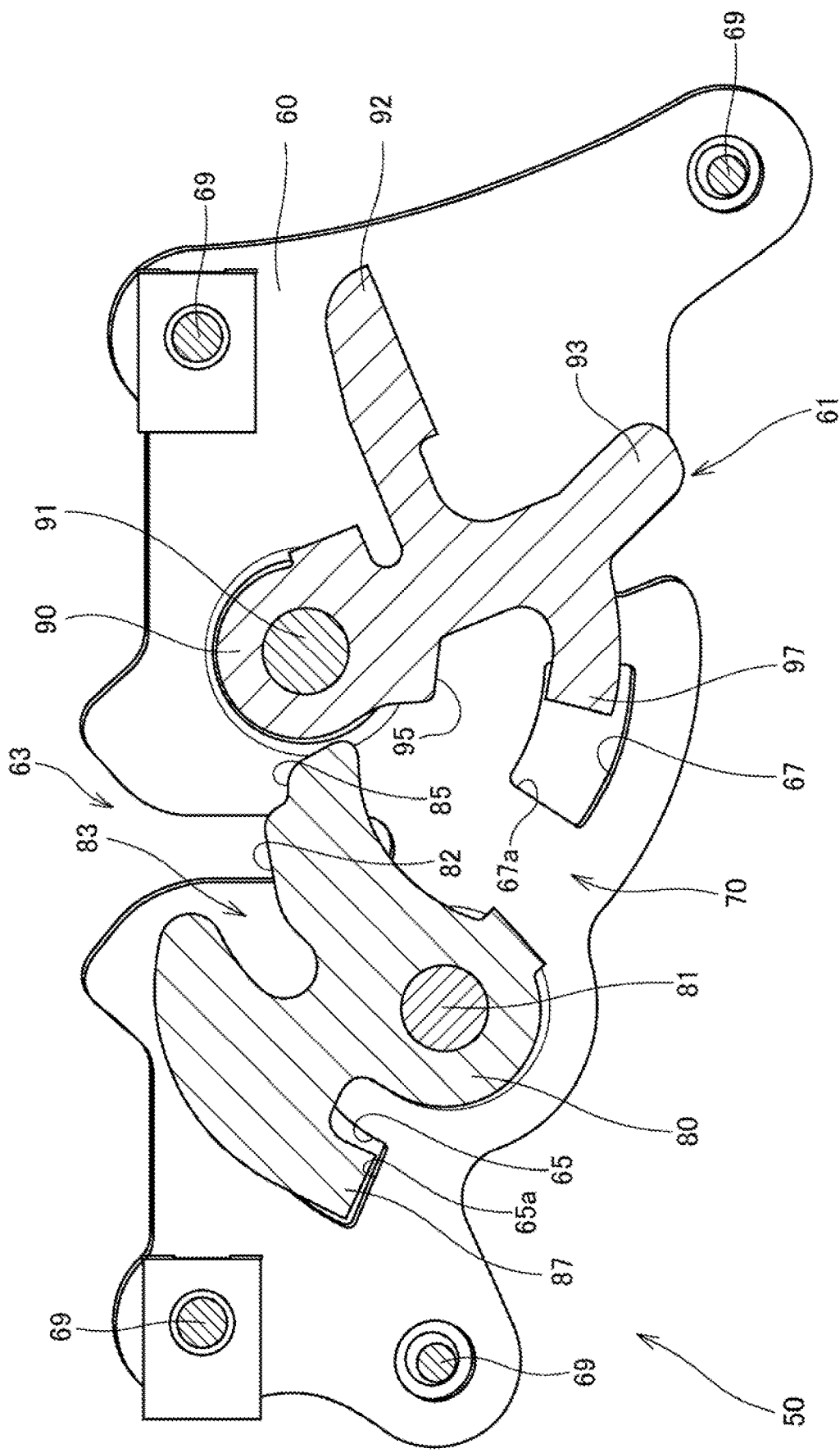
FIG. 8 is a cross-sectional view illustrating a cam member at the time when the lock mechanism is being unlocked according to the embodiment.

In this state, as illustrated in FIG. 7, the rotation lock plate 57 is out of the plate-receiving concave part 61 formed in the cam support member 60.

The first cam 80 is urged in a counterclockwise direction in FIG. 7, by a spring force of the tension spring 71, and the first engaging protrusion 87 contacts an end wall 65*a* of the first guide part 65. The second cam 90 is urged in a clockwise direction in FIG. 7, by a spring force of the tension spring 71, and the second engaging protrusion 97 contacts an end wall 67*a* of the second guide part 67.

(Operation for Closing the Lid Member 40)

While the lid member 40 is being closed, the lock pin 43 provided at the lid member 40 is first inserted into the pin-receiving concave part 63 formed in the cam support member 60, and then contacts the first curved part 82 of the first cam 80 and pushes the first curved part 82.

When the lid member 40 is being closed further, the lock pin 43 makes the first cam 80 start to rotate clockwise in FIG. 7 against a spring force of the tension spring 71, and is inserted into the first concave part 83 of the first cam 80.

In a case that the first cam 80 is rotated, the first engaging part 85 of the first cam 80 engages with the second engaging part 95 of the second cam 90 and rotates the second cam 90 in a counterclockwise direction against a spring force of the tension spring 71. In a case that the first engaging part 85 climbs over the second engaging part 95, the second cam 90 moves back by a spring force of the tension spring 71 to rotate clockwise, and the first engaging part 85 and the second engaging part 95 are engaged with each other as illustrated in FIG. 6.

In a case that the lid member 40 is completely closed, the lock pin 43 is bound in a substantially rectangular-shaped region S (see FIG. 6) surrounded by the first concave part 83 and the pin-receiving concave part 63.

(Operation for Opening the Lid Member 40)

While the lid member 40 is closed, the lock pin 43 is bound in the region S as illustrated in FIG. 6. In a case that the lock mechanism 50 is not locked, such as in a situation immediately after the lid member 40 has been closed as described above, the rotation lock plate 57 in FIG. 6 is retracted and is out of the plate-receiving concave part 61.

In this state, if the operation member 55 is pushed down, the lever 59 is tilted around the lever support shaft 52 and lifts the lever receiving part 92 up. In a case that the lever receiving part 92 is lifted up, the second cam 90 rotates counterclockwise as illustrated in FIG. 8 and the second engaging part 95 detaches from the first engaging part 85 of the first cam 80. By the detachment, the restriction of the rotation of the first cam 80 is released, and the first cam 80 starts to rotate counterclockwise by the tension spring 71.

By the rotation of the first cam 80, the lock pin 43 escapes from the first concave part 83 and the pin-receiving concave part 63 and the lid member 40 is opened.

(Operation for Locking the Lock Mechanism 50)

On the other hand, after the lid member 40 is completely closed, as illustrated in FIG. 4, the key 54 can be inserted into the key cylinder 53 and the key 54 can be rotated to a lock position. By the operation of the key, the rotation lock plate 57 is, as illustrated in FIG. 6, inserted into the plate-receiving concave part 61 and rotates to a position along the contact part 62, and the lock mechanism 50 is locked.

The rotation lock plate 57 does not need to be provided at the key cylinder 53. For example, the rotation lock plate 57 may be rotated by an electronically controlled device. The rotation lock plate 57 does not need to be rotated, as long as it is able to lock the lock mechanism 50 by being positioned along the contact part 62 and is provided movable to a position where it does not lock the lock mechanism 50.

(Function of the Lock Mechanism 50 in a Locked State)

While the lock mechanism 50 is in a locked state, if the operation member 55 is pushed down, the lever 59 of the operation member 55 lifts up the lever receiving part 92. In a case that the lever receiving part 92 is lifted up, the second cam 90 is rotated counterclockwise in FIG. 7. However, in this case, the second protruding part 93 of the second cam 90 contacts the rotation lock plate 57 and the rotation of the second cam 90 is restricted.

In a case that the rotation of the second cam 90 is restricted, because the second engaging part 95 continues contacting the first engaging part 85 of the first cam 80, a state where the rotation of the first cam 80 is restricted can be maintained even though the operation member 55 is pushed down. Therefore, because a state where the lock pin 43 is surrounded all around by the first concave part 83 and the pin-receiving concave part 63 is maintained, the lid member 40 is kept unopened.

In this state, the second protruding part 93 contacts the rotation lock plate 57 to restrict the rotation of the second cam 90, so that a movable range of the lever receiving part 92 is also limited. Therefore, in a state where the lock mechanism 50 is locked, a range of a pushing operation on the operation member 55 is also limited.

As described above, in a case that the lock mechanism 50 is locked, the pushing operation on the operation member 55 itself is restricted, the operator pushing the operation member 55 can determine that the lock mechanism 50 is locked, with a touch feel when the operation member 55 is pushed down.

Also, while the lock mechanism 50 is locked, the operation member 55 can be pushed down with a large load by any reason.

In such a situation, the second protruding part 93 can be strongly pushed to the rotation lock plate 57. This can bend or deform the rotation lock plate 57 in a rotational direction of the second cam 90.

In the present embodiment, the rotation lock plate 57 that is bent or deformed at a certain amount or more is pushed to the contact part 62 of the plate-receiving concave part 61. This makes the rotation lock plate 57 reinforced by the contact part 62, and reduces possibility of disengagement of the rotation lock plate 57 from the second protruding part 93 of the second cam 90 due to the bending or deformation of the rotation lock plate 57.

Therefore, even in a case that the operation member 55 is pushed down with a large load, the rotation lock plate 57 makes it easier to continue restricting the rotation of the second protruding part 93, thus the lock state of the lock mechanism 50 is maintained more easily.

As described above, according to the embodiment of the present invention, the lock mechanism 50 of the storage box 30 can secure and release the lock pin 43 of the lid member 40 with the rotational operation of the first cam 80 and the second cam 90. The lock mechanism 50 of the storage box 30 includes the cam support member 60 that supports the first cam 80 and the second cam 90, and a rotation lock plate 57 that restricts the rotational movement of the first cam 80 and the second cam 90. The rotation lock plate 57 restricts the rotational movement of the first cam 80 and the second cam 90 while the rotation lock plate 57 is at a position along the contact part 62 provided on the cam support member 60.

According to this configuration, the rotation lock plate 57 that restricts the rotation of the first cam 80 and the second cam 90, is reinforced by the contact part 62 provided on the cam support member 60. Therefore, in a case that the rotation lock plate 57 is at a position along the contact part 62, it is difficult to release the lock of the lock mechanism 50 even though a large force is applied to the rotation lock plate 57.

The second cam 90 is rotated by the movement of the operation member 55 activated by a user's operation and the rotational movement of the second cam 90 is restricted by the rotation lock plate 57.

According to this configuration, the rotation movement of the second cam 90 interlocked with the operation member 55 is restricted by the rotation lock plate 57, and a movable range of the operation member 55 itself is also limited. Thus, the operator can confirm whether the lock mechanism 50 is locked, by a touch feel when the operator operates the operation member 55.

The cam support member 60 includes the first guide part 65 in which the first engaging protrusion 87 of the first cam 80 slides, and the second guide part 67 in which the second engaging protrusion 97 of the second cam 90 slides.

According to this configuration, the first guide part 65 and the second guide part 67 guide rotation of the first cam 80 and the second cam 90, respectively, and thus rattling of the first cam 80 and the second cam 90 can be suppressed. Also, the rotation ranges of the first cam 80 and the second cam 90 are limited, and thus the rotation of the first cam 80 and the second cam 90 to an unexpected angle can be restricted.

The rotation lock plate 57 is operated to be rotated by the rotation of the key cylinder 53, and the key cylinder 53 is arranged between the operation member 55 and the cam mechanism 70 including the first cam 80 and the second cam 90.

According to this configuration, the lock mechanism 50 provided with the storage box 30 can be arranged compactly.

[Configurations Supported by the Above-Described Embodiment]

The above-described embodiment supports configurations described below.

(Configuration 1)

A lock mechanism of a storage box, the lock mechanism being capable of securing and releasing a lock pin of a lid member with a rotational operation of a cam member, the lock mechanism including a cam support member for supporting the cam member, and a rotation lock plate for restricting a rotational movement of the cam member, in which the rotation lock plate is configured to restrict the rotational movement of the cam member in a case that the rotation lock plate is at a position along a contact part provided on the cam support member.

According to this configuration, the rotation lock plate that restricts the rotational movement of the cam member, is reinforced by the contact part provided on the cam support member. Thus, it is difficult to release the lock between the housing and the lid even though a large force is applied to the rotation lock plate.

(Configuration 2)

The lock mechanism of the storage box of Configuration 1, in which the cam member comprises a first cam and a second cam, and the second cam is rotated by a movement of an operation member activated by an operation of a user and the rotational movement of the second cam is restricted by the rotation lock plate.

According to this configuration, the rotation of the second cam interlocked with the operation member is restricted by the rotation lock plate, and a movable range of the operation member is also limited. Thus, the user can confirm whether the lock mechanism is locked, by a touch feel when the user operates the operation member.

(Configuration 3)

The lock mechanism of the storage box of Configuration 1 or 2, in which the cam support member comprises a guide part for guiding a sliding movement of a part of the cam member.

According to this configuration, the guide part guides rotation of the cam member, which can suppress rattling of the cam member. Also, a rotation range of the cam member is limited, which can restrict rotation of the cam member to an unexpected angle.

(Configuration 4)

The lock mechanism of the storage box of Configuration 2, in which the rotation lock plate is operated to be rotated by a rotation of a key cylinder, and the key cylinder is arranged between the operation member and a cam mechanism including the cam member.

According to this configuration, the lock mechanism can be arranged compactly.

REFERENCE SIGNS LIST

10 saddle-ride vehicle
30 storage box
40 lid member
43 lock pin
50 lock mechanism
53 key cylinder
55 operation member
57 rotation lock plate
60 cam support member
62 contact part
65 first guide part (guide part)
67 second guide part (guide part)

70 cam mechanism
80 first cam (cam member)
83 first concave part
87 first engaging protrusion (part of cam member)
90 second cam (cam member)
93 second protruding part
97 second engaging protrusion (part of cam member)

What is claimed is:

1. A lock mechanism of a storage box comprising a housing having an opening at a top part thereof and a lid member that is connected to the housing and movable so as to open and close, the lock mechanism being capable of securing and releasing a lock pin of the lid member with a rotational operation of a first cam member and a second cam member, wherein
   the housing includes a cam support member for supporting the first cam member and the second cam member that are rotatable in opposite directions to each other, and a rotation lock plate for restricting rotational movements of the first cam member and the second cam member,
   the second cam member includes a second protruding part that contacts the rotation lock plate,
   the cam support member includes a contact part provided in a rotation range of the second protruding part and at a plane or a side of the cam support member facing against a rotational direction of the second cam member,
   the lock pin is inserted into a first concave portion of the first cam member while the lid member is being closed,
   a first engaging part of the first cam member engages with a second engaging part of the second cam member so as to lock the lid member,
   the second cam member rotates, in a direction in which an engagement between the first engaging part and the second engaging part is released, while being pushed down by a lever of an operation member, and
   when the operation member is operated in a state where the lock mechanism is locked, the second protruding part comes into contact with the rotation lock plate and the rotation lock plate comes into contact with the contact part so as to restrict the rotational movement of the second cam member.

2. The lock mechanism of the storage box of claim 1, wherein
   the second cam member is rotated by a movement of the operation member activated by an operation of a user and the rotational movement of the second cam member is restricted by the rotation lock plate.

3. The lock mechanism of the storage box of claim 1, wherein
   the cam support member comprises a guide part for guiding a sliding movement of at least one of the first and second cam members.

4. The lock mechanism of the storage box of claim 2, wherein
   the rotation lock plate is operated to be rotated by a rotation of a key cylinder, and
   the key cylinder is arranged between the operation member and a cam mechanism including the first and second cam members.

5. The lock mechanism of the storage box of claim 1, wherein
   the rotation lock plate is configured to restrict the rotational movement of the second cam member in a case that the rotation lock plate is at a position along a contact part provided on the cam support member.

6. The lock mechanism of the storage box of claim 1, wherein
   the contact part is provided on a plate-receiving concave part of the cam support member, and wherein the rotation lock plate is inserted into the plate-receiving concave part.

* * * * *